United States Patent [19]
Venugopal et al.

[11] Patent Number: 6,165,233
[45] Date of Patent: Dec. 26, 2000

[54] METHOD OF MAKING ELECTROCHEMICAL CELLS WITH SELF-IMPOSED STACK PRESSURE

[75] Inventors: Ganesh Venugopal, Duluth; Edmond Louie, Lawrenceville, both of Ga.

[73] Assignee: Motorola, Inc., Schaumburg, Ill.

[21] Appl. No.: 09/072,795

[22] Filed: May 5, 1998

[51] Int. Cl.[7] .................................................. H01M 10/38

[52] U.S. Cl. ............................................. 29/623.1; 429/94

[58] Field of Search ...................... 429/95, 254; 29/623.1

[56] References Cited

U.S. PATENT DOCUMENTS 4,654,281  3/1987  Anderman et al. .
5,843,594  12/1998  Cheong et al. .
5,853,914  12/1998  Kawakami .

Primary Examiner—John S. Maples
Attorney, Agent, or Firm—Philip H. Burrus, IV; Felipe J. Farley

[57] ABSTRACT

A method of fabricating a wound cell that retains its shape includes the steps of employing a heat-shrinkable porous membrane as the cell separator, and heating the cell wind either before or after addition of electrolyte.

2 Claims, 3 Drawing Sheets

*1*

METHOD OF MAKING ELECTROCHEMICAL CELLS WITH SELF-IMPOSED STACK PRESSURE

TECHNICAL FIELD

This invention relates in general to the field of electrochemical cells, and in particular to methods of constraining the dimensions of wound cells.

BACKGROUND OF THE INVENTION

As electronic devices increasingly become portable, advances must be made in energy storage systems to enable such portability. Indeed, it is often the case with current electronic technology that the limiting factor to portability of a given device is the size and the weight of the associated energy storage device. A small energy storage device, such as a battery, may be fabricated for a given electrical device but at the cost of energy capacity. Conversely, a long lasting energy source can be built but it is often too large or too bulky to be comfortably portable. The result is that the energy source is either too heavy or does not last long enough for a particular user's application.

Numerous different battery systems have been proposed for use over the years. Early rechargeable battery systems included lead acid, and nickel cadmium (NiCad), each of which has enjoyed considerable success in the market place. Lead acid batteries are preferred for applications in which ruggedness and durability are required and hence have been the choice of automotive and heavy industrial settings. Conversely, NiCad batteries have been preferred for smaller portable applications. More recently, nickel metal hydride systems (NiMH) have found increasing acceptance for both large and small applications.

Notwithstanding the success of the foregoing battery systems, other new batteries are appearing on the horizon which offer the promise of better capacity, better power density, longer cycle life, and lower weight, as compared with the current state of the art. The first such system to reach the market is the lithium ion battery, which is already finding its way into numerous consumer products. Lithium polymer batteries are also receiving considerable attention, although they have not yet reached the market.

Lithium ion batteries in general include a positive electrode fabricated of, for example, a transition metal oxide material and a negative electrode fabricated of an activated carbon material such as graphite or petroleum coke. New materials for both electrodes have been investigated intensely because of the high potential for improved energy density. Typically the positive and negative electrodes are permeated by a shared electrolyte medium, and are held in close proximity at a uniform distance from each other so as to minimize cell polarization while maximizing the uniformity and efficiency of capacity utilization across the cell. To prevent short circuits and yet allow ion migration across the cell, a thin plastic microporous membrane is commonly placed between the negative and positive electrodes of lithium ion cells.

The pressure exerted to maintain the cell in the preferred dimensions is referred to as "stack pressure" due to the serial arrangement of cells either as flat stacks or as a single cell wound as an evenly spooled coils around itself in a circular "stack". In commercial lithium ion cells, stack pressure is typically enforced by placing a tightly rolled ("jelly roll") cell into a rigid metal can (often cylindrical in shape) with internal dimensions that are only slightly larger than the full size of the "jelly roll". However recently the industry has been moving toward lighter packaging materials: when the cell is housed instead in a flexible, heat-sealable material, such as a thin foil bonded in a sandwich to layers of plastic sheeting, the housing material can no longer be expected to provide sufficient rigidity and strength to enforce the stack pressure of the cell.

Accordingly, there exists a need for improved cell configurations to constrain cells to preferred dimensions and to constrain opposite electrodes to close, uniform proximities.

DETAILED DESCRIPTION OF THE PREFERRED EMBODIMENT

Figure 1:
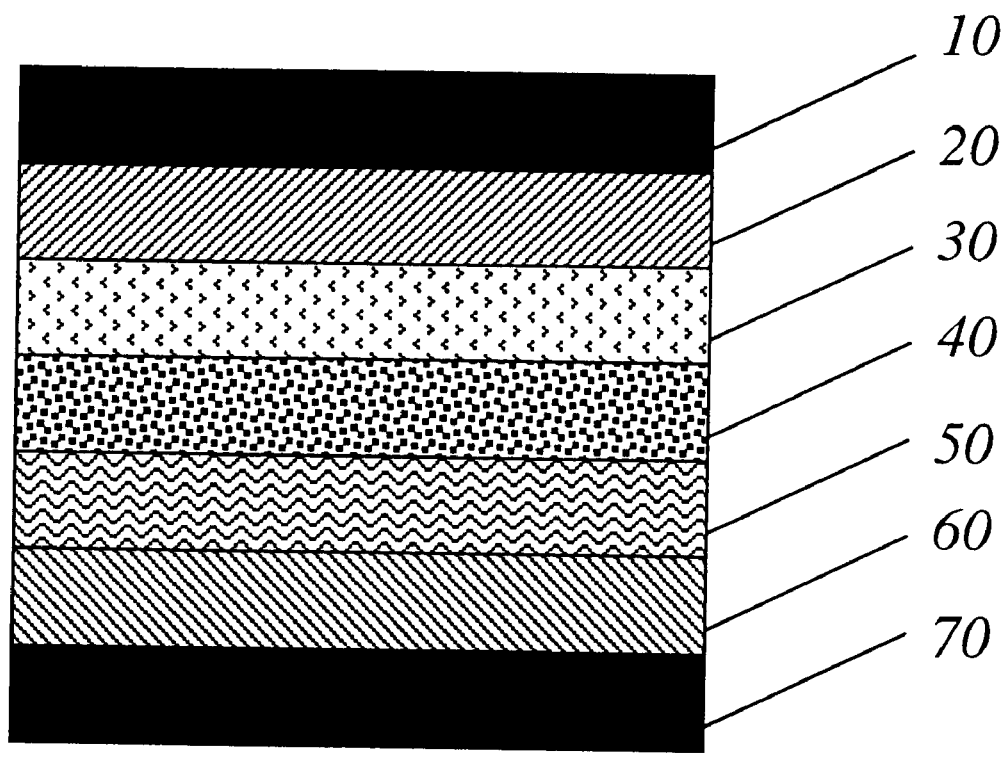
FIG. 1 is a schematic representation of an electrochemical cell (1) comprising a cathode (20) and an anode (60), and also comprising a microporous plastic separator (40) shown optionally coated with a gellable adhesive: i.e., the gellable adhesive forms an intermediate layer (30) bonding the separator to the cathode, and a comparable layer (50) bonding the separator to the anode. Layers 10 and 70 represent neighboring microporous plastic separators optionally with gellable adhesive layer
Figure 2:
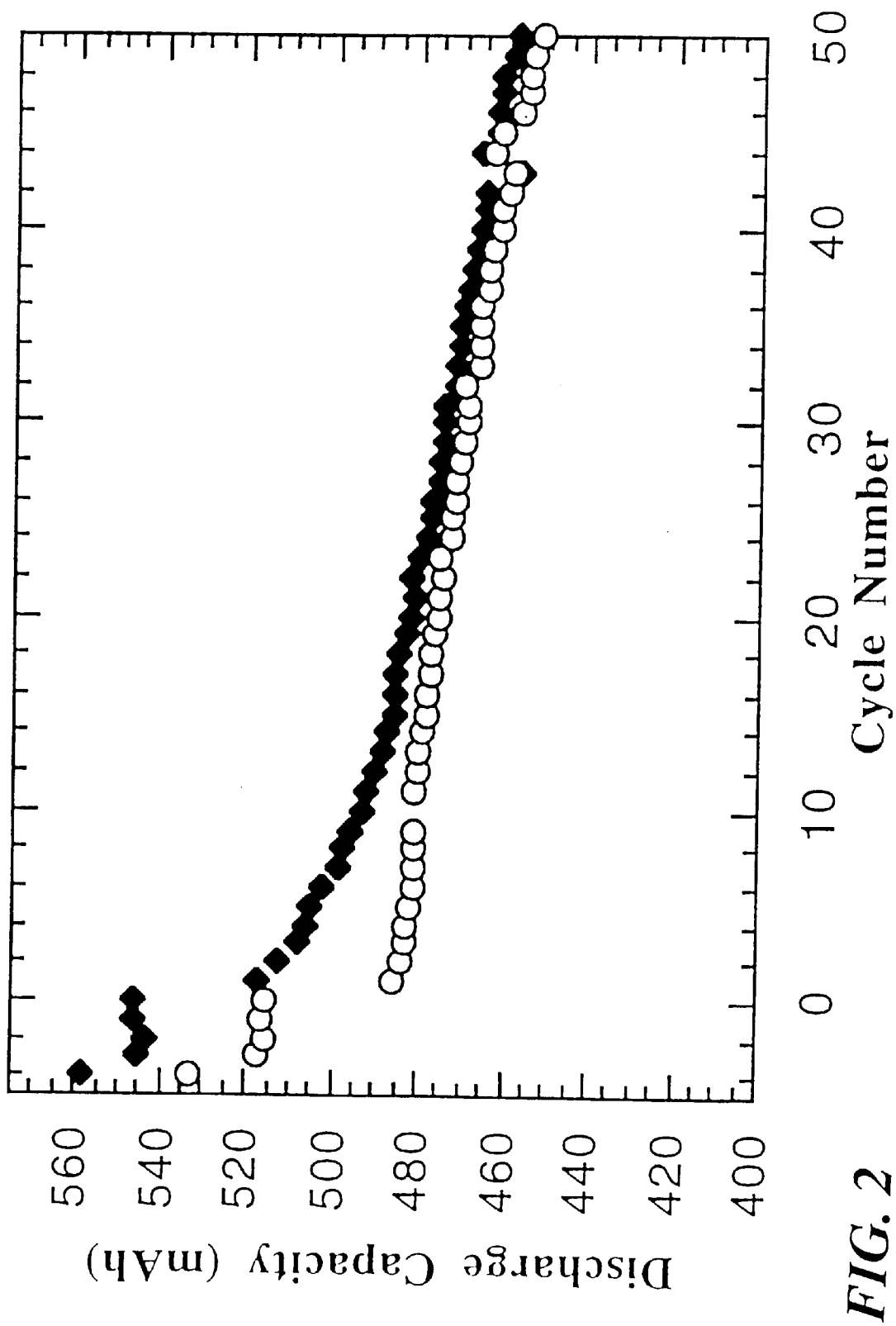
FIG. 2 is a graph showing discharge capacity versus electrochemical cycle number for cells with a graphite anode, a lithium cobalt oxide cathode, and a shrinkable microporous polyethylene separator. The solid diamonds represent the performance of one cell made according to the present invention; the open circles represents the performance of a second cell made in the same manner.
Figure 3:
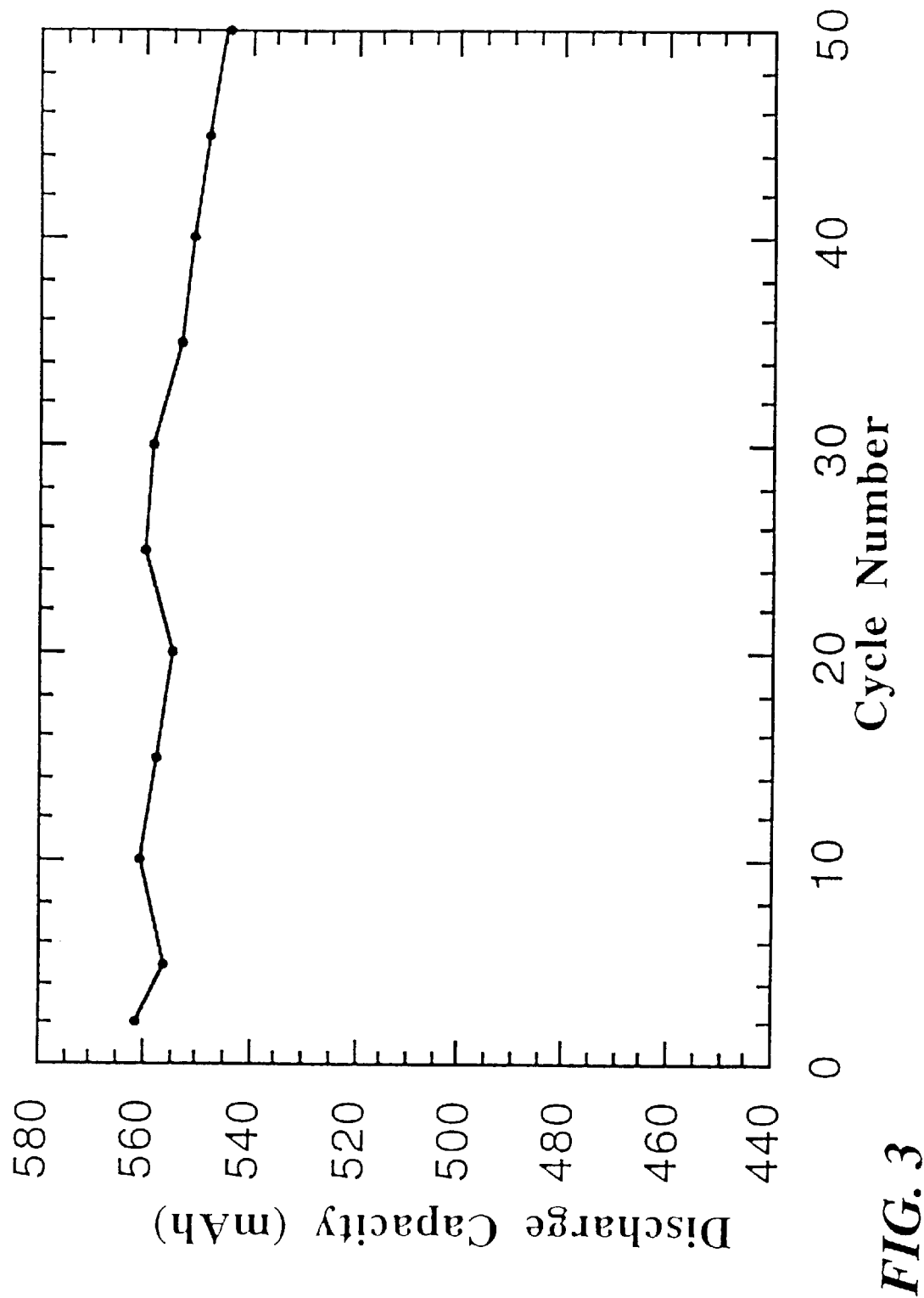
FIG. 3 is a graph showing discharge capacity versus electrochemical cycle number for a cell made according to the present invention; that cell comprised an amorphous carbon anode, a lithium nickel oxide cathode, and a shrinkable microporous polyethylene separator.

The invention is a method of fabricating a wound cell that retains its shape, and includes the steps of employing a heat-shrinkable porous membrane as the cell separator, and heating the cell wind either before or after addition of electrolyte. This shrinkage of the porous membrane constrains the tightness of the coil in wound cells to a preestablished shape, and prevents the cell from unraveling or loosening its wind. However the separator's micropores are not melted shut during the constructive shrinkage.

We have found in the past that cell performance can be improved by employing a gellable adhesive layer to bond electrodes to a separator. In the instant invention, we have found that the electrochemical cycling performance of a wound cell can be further improved by incorporating a shrinkable separator, due apparently to the constriction of the separator to maintain physical proximity of the electrodes. If desired, such a shrinkable separator may be employed without an adhesive layer bonding it to the electrodes. The improvement was obtained by heating cells outfitted with certain grades of polyolefin separator, though the invention is not so limited. We find that different articles comprised of the same plastic may not necessarily exhibit the same shrinkage or melt behaviors, since intrinsic shrinkage properties of an article are dependent upon degree of crystallinity, pore size, film thickness, pore concentration and distribution, and other factors.

It was found that free-standing plastic membranes with optimal properties manifested under the heating conditions a dimensional shrinkage in excess of about 5% along at least one dimension. It should be noted that optimal shrinkage depends on the configuration and size of the cells employed; in the present examples, the cells were ca. 4 cm (length of flattened cell wind)×3 cm (width)×1 cm (thickness of flattened wind). The plastic membrane used in the examples below, Celgard 2700, shrank nearly 30% during treatment of the free-standing membrane at 90° C. for 5 minutes, yet retained its porosity.

We note that our invention adds no mass to the cell beyond that which would already be present because of the native mass of the cell components. This is in contrast to methods such as the step of shrink-wrapping a plastic collar around a cell to compress its dimensions in a recent patent (U.S. Pat. No. 5,670,272).

Lithium-derived chemistries are currently employed in so-called "flat cells" that benefit from the method introduced by the instant invention, though it is not so limited. Anodes for said lithium-derived chemistries typically comprise an electrode active material selected from the group consisting of graphite, coke, amorphous carbon, lithium metal, lithium alloys, lithium metal oxides, lithium metal sulfides, conducting polymers, and combinations thereof. Cathodes for said lithium-derived chemistries typically comprise an electrode active material selected from the group consisting of graphite, coke, amorphous carbon, lithium metal, lithium alloys, lithium metal oxides, lithium metal sulfides, conducting polymers and combinations thereof. Typical separators for cells based on lithium-derived chemistries comprises a polymer selected from the group consisting of thermoplastic polymers, though in addition or instead of thermoplastic polymers, thermoset polymers, sol-gel polymers, and combinations thereof may also be employed.

It is believed that the invention may be better understood by a consideration of the following examples.

EXAMPLE 1

Two cells rated for 500 mAh were assembled. The anode consisted of a 4-cm-wide, 35.4 cm-long (of which 1.0 cm at one end was uncoated on both sides), 0.051 mm-thick 50% open copper mesh with 0.0003 mm diagonal lengths for open diamonds [Delker Corp., P.O. Box 427, 16 Commercial Street, Branford, Conn. 06405, U.S.A., (203) 481-4277] coated on both sides and then calendered to densify it: the final electrode was 0.186 mm thick and had a coating density of 1.28 g/c.c. It comprised a formulation consisting of 85.0 mass % SFG-44, 3.0 mass % Super P black carbon, and 12.0 mass % polyvinylidene fluoride. [The graphite was "Timrex SFG-44", Timus Corp. (Timcal America Inc.), 29299 Clemens Road 1-L, Westlake, Ohio 44145, U.S.A., (216) 871-7504. The PVDF was "Kynar 461" grade, Elf Atochem, Fluoropolymers division, 2000 Market Street, Philadelphia, Pa. 19103, U.S.A. The black carbon was sold under the tradename, "Super P Battery Black" by S.A. MMM. N.V. Avenue Louise 534 bte. 1, B-1050 Brussels-Belgium.

The cathode consisted of 3.8 cm-wide, 29.0 cm-long (including 1.0 cm at one end uncoated on both sides), 0.050 mm-thick, 50% open aluminum mesh with 0.0003 mm diagonal lengths for open diamonds [Delker Corp., P.O. Box 427, 16 Commercial Street, Branford, Conn. 06405, U.S.A., (203) 481-42771] coated on both sides and then calendered to densify it to a final electrode thickness of 0.171 mm and 3.13 g/c.c. electrode density. It comprised a formulation consisting of 83.0 mass % lithium cobalt oxide, 7.5 mass % Super P black carbon, 2.5 mass % KS-6 graphite, and 7.0 mass % polyvinylidene fluoride (Kynar 461). [KS-6 is sold by Lonza Inorganic Chemical Division, 22-10 Route 208, Fair Lawn, N.J. 07410, U.S.A., (201) 794-2400; Lonza is a division of Timus Corp., 29299 Clemens Road 1-L, Westlake, Ohio 44145, U.S.A. The lithium cobalt oxide was "C-10" grade from Nippon Chemical Industrial Co., Head Office 15-1,9-chome, Kameido, Koto-du, Tokyo 136 JAPAN tel. no. (03)3636-8111; Specialty Chemicals Division, same address, tel. no. (03)3636-8049].

These electrodes were sandwiched by two lengths of shrinkable polyethylene separator used as received [Celgard 2700 polyethylene separator, Hoechst Celanese, 13800 South Lakes Drive, Charlotte, N.C. 28273, telephone no. (704) 587-84331, 4.2 cm-wide, 100 cm-long, 0.025 mm-thick). The cell was constructed in the dry state as a sandwich of (from the bottom up), anode, separator, cathode, separator, with the separators overlapping the edges of the electrodes to prevent direct contact between the electrodes. The sandwich was wound as a flattened coil on a Kaido Table Top winder [type KMW-2BYQ, Kaido Manufacturing Co., Ltd., Kyoto JAPAN], then taped with a colorless transparent strip of tape, and then placed in a plastic/foil/ plastic laminate "butter dish" housing [proprietary development grade from Lawson Marden Flexible, 6700 Midland Industrial Drive, PO Box 1087, Shelbyville, Ky. 40065, U.S.A.; Tel: +1 502 647 2200; Fax: +1 502 647 2281; E-mail Contact: Mitch Mekaelian; other grades used were obtained from Hueck Foils Llc., Building A Suite 201, 2519 Route 35, Masasquan, N.J. 08736; phone (732) 528-0500]. The cell was wetted with 3.5 mL of electrolyte solution (40 vol % ethylene carbonate, 60 vol % diethyl carbonate, 1M LiPF6, [Tomiyama Pure Chemical Industries, Nikko buildings, 5–7, Nihonbashi-Honcho, 2-chome, Chuo-ku, Tokyo, Japan]), and the housing lid was heat-sealed to its base. After allowing the electrolyte to wick into the cell, the cell was heat treated for 5 minutes at 90° C. under 50 pounds applied pressure.

Following five break-in cycles at C/5 rate between 3.0V and 4.2V and fifty cycles at C/2 rate, one cell had 458 mAh reversible capacity remaining (ca. 88% of C/2 its first-cycle capacity) while the other retained 452 mAh reversible capacity (ca. 93% of its C/2 first-cycle capacity). The performance of these cells is represented in FIG. 20. The cycled cells were dissected, and no evidence of plating of metallic lithium was found at the anode separator interface.

EXAMPLE 2

One cell rated for 500 mAh was assembled as in Example 1, with the following differences. Foils were used instead of mesh substrates [e.g., foils were obtained from All-Foils Inc., 4597 Van Epps Road, Brooklyn Heights, Ohio, 44131, U.S.A., (800) 521-0054; (216) 661-0211]. The foils were 0.0125 mm thick. The cathode foil was 3.8 cm wide, 35.0 cm long (1.0 cm at one end was uncoated on both sides), while the anode foil was 4.0 cm wide, 41.0 cm long (1.0 cm on one end was uncoated on both sides). The final anode was 0.186 mm-thick with a density of 1.28 g/c.c.; its formulation comprised 46 mass % graphite; 46 mass % amorphous carbon (synthesized as described in U.S. patent application Ser. No. 08/660,320 and having an intrinsic first cycle efficiency of ca. 67% and second cycle reversible capacity of ca. 450); together with 8 mass % polyvinylidene fluoride (Kynar 461).

The cathode coating was 0.171 mm-thick with a density of 3.13 g/c.c. Its formulation was comprised of 91.0 mass % lithium nickel oxide (the synthesis of which is described in U.S. patent application Ser. No. 08/878,186, and having an intrinsic first cycle efficiency of ca. 90% and second cycle reversible capacity of ca. 200 mAh/g) together with 1.0 mass % black carbon, 4.0 mass % graphite, and 4.0 mass % polyvinylidene fluoride.

Following one break-in cycle at C/2 rate between 3.0V and 4.1V and then fifty cycles at C/2 rate, the cell had 545 mAh reversible capacity remaining (ca. 97% of its first-cycle capacity after breaking in); this performance is shown in FIG. 30. The cycled cell was dissected, and no evidence of plating of metallic lithium was found at the anode separator interface.

Although the examples given here have illustrated the shrinkage of the cell separator for a cell already wetted with electrolyte, the invention is not so limited. Thus the separator shrinkage step may be employed: prior to addition of electrolyte; following addition of electrolyte but before sealing of the package; by addition of hot electrolyte; after sealing of the package before the electrolyte has fully wicked into the cell; after sealing of the package for a fully wetted cell; and or after one or more electrochemical cycles for the packaged cell. Other permutations such as the use of one shrinkable and one non-shrinkable separator in the same cell may be envisioned, as can be permutations such as cell winds in which a shrinkable separator is employed only in a fraction of the winding length.

Moreover, the invention is not limited to membrane compositions of polyethylene or other polyolefins. The invention is only limited to those separator compositions that may be induced to undergo a reduction in dimension the wound cell. Examples of means that may be used to induce such shrinkage include heat, ultraviolet light, bombardment with high energy particles, and other radiation and photoirradiation. Other examples of means that may be used to induce shrinkage include exposure to an activating substance such as in acidification, basicification, exposure to a catalyst or cross-linking reagent, and or exposure to an activating electrical potential (e.g., during cycling in said same cell).

Furthermore, the invention is not limited to cells comprising lithium ion chemistries, but may be employed for other types of electrochemical cells, such as nickel—cadmium, nickel-metal hydride, nickel hydrogen, capacitors, photovoltaic cells, fuel cells, electrochromic cells, et al.

The means and configuration of winding are not limiting to this invention, thus, for instance the cell may or may not be wound about a winding platform such such that a mandrel serves as a common axis for the wind. Alternatively, a mandrel may optionally be located in the interior of the cell following winding.

It will be appreciated by now that there has been provided an improved method for constraining cells to optimal dimensions and preserving relative coil configurations for the purpose of electrochemical cycling. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of fabricating a cell with improved stack pressure, said method comprising the steps of:

winding an anode, a cathode, a shrinkable separator, and a non-shrinkable separator as a stack concentrically about a common axis; and shrinking the shrinkable separator.

2. A method of fabricating a cell with improved stack pressure, said method comprising the steps of:

winding an anode, a cathode, and a separator as a stack concentrically about a common axis, wherein a portion of the separator is shrinkable and a portion of the separator is not shrinkable; and shrinking the portion of the separator that is shrinkable.

* * * * *